United States Patent
Liu

(10) Patent No.: US 11,323,034 B2
(45) Date of Patent: May 3, 2022

(54) VOLTAGE GENERATING CIRCUIT WITH TIMING SKIPPING CONTROL

(71) Applicant: HIMAX TECHNOLOGIES LIMITED, Tainan (TW)

(72) Inventor: Yu-Hsuan Liu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 115 days.

(21) Appl. No.: 16/808,334

(22) Filed: Mar. 3, 2020

(65) Prior Publication Data

US 2021/0281180 A1 Sep. 9, 2021

(51) Int. Cl.
*H02M 3/158* (2006.01)
*H02M 1/38* (2007.01)
*H02M 1/00* (2006.01)

(52) U.S. Cl.
CPC ....... *H02M 3/1588* (2013.01); *H02M 1/0043* (2021.05); *H02M 1/38* (2013.01); *H02M 3/158* (2013.01)

(58) Field of Classification Search
CPC .... H02M 1/009; H02M 1/008; H02M 3/1582; H02M 3/158; H02M 3/156; H02M 3/1588; H02M 3/157; H02M 3/07
See application file for complete search history.

(56) References Cited

U.S. PATENT DOCUMENTS

| | | | |
|---|---|---|---|
| 9,203,310 B2* | 12/2015 | Huang | H02M 3/158 |
| 9,660,599 B2 | 5/2017 | Dally | |
| 9,692,296 B1* | 6/2017 | Dash | H02M 3/158 |
| 10,622,900 B1* | 4/2020 | Wei | H02M 3/1584 |
| 2009/0315529 A1 | 12/2009 | Chung | |
| 2011/0043181 A1* | 2/2011 | Jing | H02M 3/158 323/288 |
| 2012/0169307 A1* | 7/2012 | Chen | H02M 3/158 323/271 |
| 2012/0274134 A1* | 11/2012 | Gasparini | H02M 3/1584 307/31 |
| 2013/0051090 A1 | 2/2013 | Xie | |

(Continued)

FOREIGN PATENT DOCUMENTS

| | | |
|---|---|---|
| EP | 3 531 546 A1 | 8/2019 |
| TW | 200803170 | 1/2008 |

(Continued)

*Primary Examiner* — Gustavo A Rosario-Benitez
(74) *Attorney, Agent, or Firm* — Winston Hsu

(57) ABSTRACT

A voltage generating circuit includes an input stage, a control stage, an inductor and an output stage. The input stage includes a plurality of comparators each generating a comparison result according to an input voltage and a reference voltage and a multiplexer configured to output a voltage control signal sequentially carrying the comparison results of the comparators. The control stage is configured to control conduction of a charging path between a power source and a first node in response to the voltage control signal. The inductor is coupled between the first node and a second node. The output stage includes a plurality of output switches coupled to the second node and turned on or off in response to a switch control signal. The switch control signals are generated according to the voltage control signal and rising edges and falling edges of the switch control signals are interleaved.

17 Claims, 8 Drawing Sheets

(56) References Cited

U.S. PATENT DOCUMENTS

| | | | |
|---|---|---|---|
| 2013/0147457 A1* | 6/2013 | Kim | H02M 3/158 323/311 |
| 2014/0232189 A1* | 8/2014 | Gasparini | H02M 3/158 307/31 |
| 2014/0285014 A1* | 9/2014 | Calhoun | H02M 3/158 307/31 |
| 2017/0012529 A1* | 1/2017 | Yamada | H02M 3/158 |
| 2019/0267981 A1 | 8/2019 | Chan | |
| 2020/0021194 A1* | 1/2020 | Samid | H02M 3/158 |
| 2020/0076298 A1* | 3/2020 | Jung | H02M 3/157 |
| 2020/0076299 A1* | 3/2020 | Xue | H02M 3/158 |
| 2020/0091836 A1* | 3/2020 | Lee | H02M 7/4826 |
| 2020/0304020 A1* | 9/2020 | Lu | H02M 3/1582 |

FOREIGN PATENT DOCUMENTS

| | | |
|---|---|---|
| TW | 200838140 | 9/2008 |
| TW | 200913492 | 3/2009 |
| TW | 201010286 A1 | 3/2010 |
| TW | 201332288 A1 | 8/2013 |

\* cited by examiner

US 11,323,034 B2

VOLTAGE GENERATING CIRCUIT WITH TIMING SKIPPING CONTROL

BACKGROUND OF THE INVENTION

1. Field of the Invention

The invention is related to voltage generating circuits, and more particularly, to the voltage generating circuits with timing skipping control to prevent occurrence of cross-regulation between multiple outputs.

2. Description of the Prior Art

A direct current (DC) converter is an electronic circuit that converts an input DC supply voltage into a DC output voltage that is higher or lower in magnitude than the input DC supply voltage. Among existing DC-DC converter implementations, a single inductor multiple-output (SIMO) DC-DC converter is a very cost-efficient solution. Only one inductor is required to provide multiple regulated outputs.

However, cross-regulation between multiple outputs is a defect of the SIMO DC-DC converter. Especially, when the difference between two outputs voltages is quite large, the cross-regulation may even cause one of them to gradually deviate from its target voltage level and finally the regulated output is unable to be provided.

To solve this problem, a novel DC-DC converter design with timing skipping control is required.

SUMMARY OF THE INVENTION

It is an objective of the invention to provide a voltage generating circuit and an associated control signal generating circuit, in order to solve the above problem.

An embodiment of the invention provides a voltage generating circuit comprises an input stage, a control stage, an inductor and an output stage. The input stage comprises a plurality of comparators each being configured to receive an input voltage and a reference voltage and generate a comparison result according to the input voltage and the reference voltage and a multiplexer coupled to the comparators and configured to output a voltage control signal sequentially carrying the comparison results of the comparators. The control stage is configured to control conduction of a charging path between a power source and a first node in response to the voltage control signal. The inductor is coupled between the first node and a second node. The output stage comprises a plurality of output switches each being coupled to the second node and selectively turned on or off in response to a corresponding switch control signal. The switch control signals are generated according to the voltage control signal and rising edges and falling edges of the switch control signals are interleaved.

Another embodiment of the invention provides a voltage generating circuit comprises an input stage, a control stage, an inductor and an output stage. The input stage comprises a first comparator configured to receive a first input voltage and a first reference voltage and generate a first comparison result according to the first input voltage and the first reference voltage, a second comparator configured to receive a second input voltage and a second reference voltage and generate a second comparison result according to the second input voltage and the second reference voltage, and a multiplexer coupled to the first comparator and the second comparator and configured to output a voltage control signal sequentially carrying the first comparison result and the second comparison result. The control stage is configured to control conduction of a charging path between a power source and a first node in response to the voltage control signal. The inductor is coupled between the first node and a second node. The output stage comprises a first output switch coupled to the second node and being selectively turned on or off in response to a first switch control signal; and a second output switch, coupled to the second node and being selectively turned on or off in response to a second switch control signal. The first switch control signal and the second switch control signal are generated according to the voltage control signal and rising edges and falling edges of the first switch control signals and rising edges and falling edges of the second switch control signals are interleaved.

Another embodiment of the invention provides a voltage generating circuit comprises an input stage, a control stage, an inductor and an output stage. The input stage comprises a predetermined number of comparators each being configured to receive an input voltage and a reference voltage and generate a comparison result according to the input voltage and the reference voltage and a multiplexer coupled to the comparators and configured to receive a predetermined number of comparator control signals and output a voltage control signal sequentially carrying the comparison results of the comparators, wherein the multiplexer controls output of the comparison results in response to the comparator control signals. The control stage is configured to control conduction of a charging path between a power source and a first node in response to the voltage control signal. The inductor is coupled between the first node and a second node. The output stage comprises a predetermined number of output switches each being coupled to the second node and selectively turned on or off in response to a corresponding switch control signal. The switch control signals are generated according to the voltage control signal and rising edges and falling edges of the switch control signal applied to n-th output switch and rising edges and falling edges of n-th comparator control signal are not overlapped, and wherein n is a positive integer smaller than or equal to the predetermined number.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
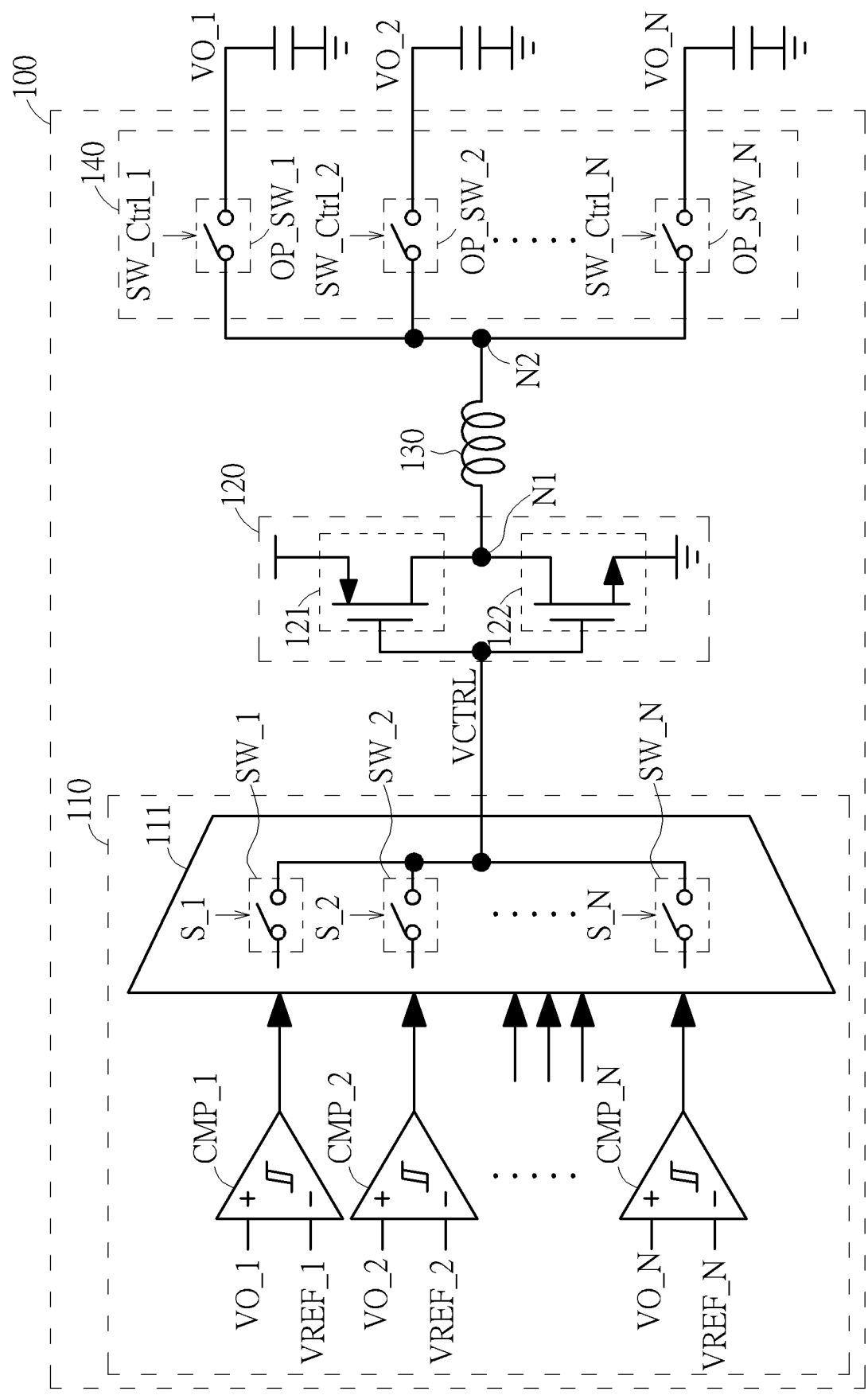
FIG. 1 is a circuit diagram of a voltage generating circuit according to an embodiment of the invention.

FIG. 1 is a circuit diagram of a voltage generating circuit according to an embodiment of the invention. The voltage generating circuit 100 may be a single inductor multiple-output (SIMO) DC-DC converter capable of generating a predetermined number (as an example, the label N shown in FIG. 1, where N is a positive integer greater than 1) of regulated output voltages.

The voltage generating circuit 100 may comprise an input stage 110, a control stage 120, an inductor 130 and an output stage 140. The input stage 110 may comprise a plurality of comparators (for example, N comparators CMP_1~CMP_N as shown) and a multiplexer 111. Each comparator is configured to receive an input voltage and a reference voltage and generate a comparison result according to the input voltage and the reference voltage. According to an embodiment of the invention, the output voltage VO_n generated at one terminal of the corresponding output switch OP_SW_n is fed back to an input terminal of the corresponding comparators CMP_n. That is, the input voltage of the comparators CMP_n and is the same as the corresponding output voltage VO_n. Therefore, in the embodiments of the invention, the input voltages of the comparators CMP_1~CMP_N are the corresponding output voltages VO_1~VO_N. As an example, the comparators CMP_1 is configured to receive the input voltage VO_1 and the reference voltage VREF_1 and generate a comparison result according to the input voltage VO_1 and the reference voltage VREF_1. The multiplexer 111 is coupled to the comparators CMP_1~CMP_N and configured to receive a plurality of comparator control signals S_1~S_N and control output of the comparison results of the comparators CMP_1~CMP_N in response to the comparator control signals S_1~S_N.

In an embodiment of the invention, the comparator control signals S_1~S_N may sequentially assert (for example, pulled high or pulled low) to turn on the corresponding switches SW_1~SW_N. When a switch SW_n is turned on in response to the corresponding comparator control signals S_n, where n is a positive integer smaller than or equal to the predetermined number N, the comparison result of the corresponding comparator CMP_n will be output as a portion of the voltage control signal VCTRL. Therefore, in the embodiments of the invention, the voltage control signal output by the multiplexer 111 sequentially carries the comparison results of the comparators CMP_1~CMP_N.

The control stage 120 may comprise one or more switch devices, such as the switch devices 121 and 122. The switch device may be, for example but not limited to, a transistor, a Metal-Oxide-Semiconductor Field-Effect Transistor (MOSFET), a power MOSFET, or others. The control stage 120 is configured to control conduction of a charging path between a power source and a first node N1 in response to the voltage control signal VCTRL. The inductor is coupled between the first node N1 and the second node N2.

The output stage 140 may comprise a plurality of output switches (for example, N output switches OP_SW_1~OP_SW_N as shown). Each output switch is coupled to the second node N2 and is turned on or off in response to a corresponding switch control signal (for example, the switch control signals SW_Ctrl_1~SW_Ctrl_N as shown). For example, when an output switch OP_SW_n is turned on in response to the corresponding switch control signals SW_Ctrl_n, the external capacitor couple to the output switch OP_SW_n will be connected to the second node N2, and when the charging path between the power source and the first node N1 is conducted as well under the control of the control stage 120, the external capacitor will be charged and an output voltage VO_n generated at one terminal of the external capacitor will rise.

In the conventional design, the output switches OP_SW_1~OP_SW_N are sequentially turned on in response to the switch control signals SW_Ctrl_1~SW_Ctrl_N. At the moment when an output switch OP_SW_n is turned on, the energy currently stored in the inductor 130 based on previous charge operation will be injected to the corresponding external capacitor, regardless of whether charging of the corresponding external capacitor is required. When the difference between two outputs voltages (for example, VO (n-1) and VO_n) is quite large, cross-regulation will occur since the energy injected to the external capacitor already exceed the amount of energy that it needs. The cross-regulation may cause the output voltage VO_n to gradually deviate from its target voltage level and finally no regulated output can be provided at this output terminal.

To solve this problem, in the embodiments of the invention, the switch control signals SW_Ctrl_1~SW_Ctrl_N are generated according to the voltage control signal VCTRL, and the output switch (e.g. OP_SW_n) is turned on to connect the external capacitor to the second node N2 only when the voltage control signal VCTRL is set to a predetermined level in response to the comparison result of a corresponding comparator (e.g. CMP_n) being representative of a condition that the corresponding input voltage (e.g. VO_n) is lower than the corresponding reference voltage (e.g. VREF_n).

For generating the switch control signals SW_Ctrl_1~SW_Ctrl_N with timing skipping control, the voltage generating circuit, such as the voltage generating circuit 100 shown in FIG. 1, may further comprise a control signal generating circuit.

Figure 2:
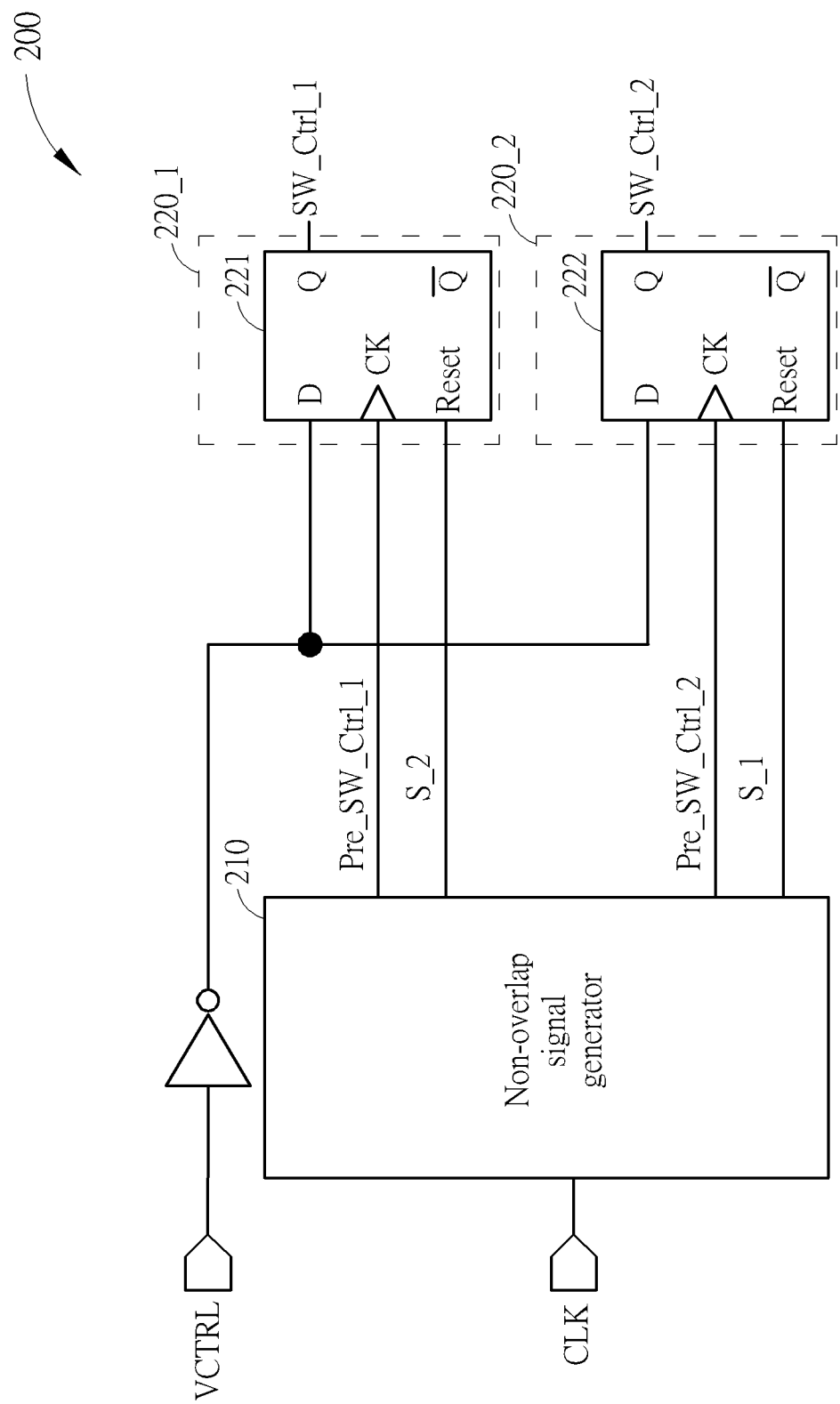
FIG. 2 is a circuit diagram of a control signal generating circuit according to an embodiment of the invention.

FIG. 2 is a circuit diagram of a control signal generating circuit according to an embodiment of the invention. The control signal generating circuit 200 is an exemplary circuit implemented when N=2. The control signal generating circuit 200 is configured to generate the switch control signals SW_Ctrl_1 and SW_Ctrl_2 and may comprise a non-overlap signal generator 210 and a plurality of flip-flop circuits 220_1 and 220_2. The non-overlap signal generator 210 is configured to generate comparator control signals S_1 and S_2 and preliminary switch control signals Pre_SW_Ctrl_1 and Pre_SW_Ctrl_2 according to a clock signal CLK.

According to an embodiment of the invention, a portion of rising edges and a portion of falling edges of the comparator control signals are overlapped. In addition, the rising edges and the falling edges of the comparator control signals and the rising edges and the falling edges of the preliminary switch control signals are interleaved.

Figure 3:
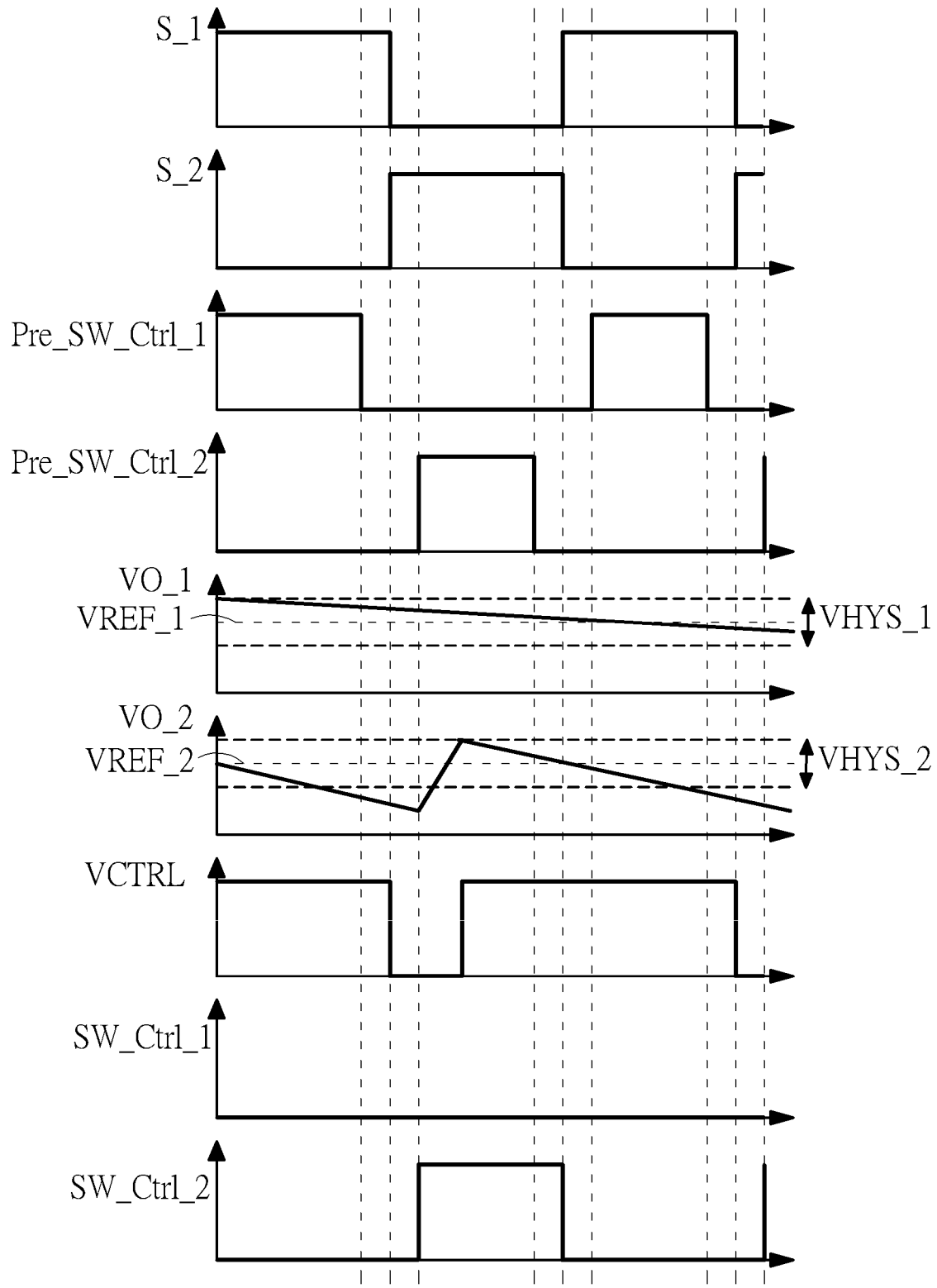
FIG. 3 is a diagram showing the waveforms of the comparator control signals, the preliminary switch control signals, the output voltages, the voltage control signal and the switch control signals according to an embodiment of the invention.

FIG. 3 is a diagram showing the waveforms of the comparator control signals, the preliminary switch control signals, the output voltages, the voltage control signal and the switch control signals, generated by the control signal generating circuit 200 as shown in FIG. 2, according to an embodiment of the invention. According to an embodiment of the invention, the falling edges of the comparator control signal S_1 and the rising edges of the comparator control signal S_2 may be aligned and the falling edges of the comparator control signal S_2 and the rising edges of the comparator control signal S_1 may be aligned. In addition, the rising edges and the falling edges of the comparator control signal S_1 and the rising edges and the falling edges of the preliminary switch control signal Pre_SW_Ctrl_1 are interleaved, and the rising edges and the falling edges of the comparator control signal S_2 and the rising edges and the falling edges of the preliminary switch control signal Pre_SW_Ctrl_2 are interleaved. In other words, the rising edges and the falling edges of the comparator control signal S_1 and the rising edges and the falling edges of the preliminary switch control signal Pre_SW_Ctrl_1 generated by the proposed non-overlap signal generator (e.g. 210) are not overlapped, and the rising edges and the falling edges of the comparator control signal S_2 and the rising edges and the falling edges of the preliminary switch control signal Pre_SW_Ctrl_2 generated by the proposed non-overlap signal generator (e.g. 210) are not overlapped.

Therefore, according to an embodiment of the invention, the rising edges and the falling edges of the preliminary switch control signals Pre_SW_Ctrl_1~Pre_SW_Ctrl_2 are interleaved (or, not overlapped), and the rising edges and the falling edges of the comparator control signals S_1~S_2 and the rising edges and the falling edges of the preliminary switch control signals Pre_SW_Ctrl_1~Pre_SW_Ctrl_2 are interleaved (or, not overlapped).

Referring back to FIG. 2, the flip-flop circuit 220_1 is configured to receive the voltage control signal VCTRL, the comparator control signal S_2 and the preliminary switch control signal Pre_SW_Ctrl_1 and generate the switch control signal SW_Ctrl_1 according to the voltage control signal VCTRL, the comparator control signal S_2 and the preliminary switch control signal Pre_SW_Ctrl_1. The flip-flop circuit 220_1 may comprise a D flip-flop 221. According to an embodiment of the invention, the voltage control signal VCTRL (or, depending on the designed logic level of the voltage control signal VCTRL, an inverted version of the voltage control signal VCTRL output by a corresponding inverter as shown in FIG. 2) is applied to an input terminal D of the D flip-flop 221, the preliminary switch control signal Pre_SW_Ctrl_1 is applied to a clock terminal CK of the D flip-flop 221 and the comparator control signal S_2 is applied to a reset terminal Reset of the D flip-flop 221.

The second-flop circuit 220_2 is configured to receive the voltage control signal VCTRL, the comparator control signal S_1 and the preliminary switch control signal Pre_SW_Ctrl_2 and generate the switch control signal SW_Ctrl_2 according to the voltage control signal VCTRL, the comparator control signal S_1 and the preliminary switch control signal Pre_SW_Ctrl_2. The flip-flop circuit 220_2 may comprise a D flip-flop 222. According to an embodiment of the invention, the voltage control signal VCTRL (or, depending on the designed logic level of the voltage control signal VCTRL, an inverted version of the voltage control signal VCTRL output by a corresponding inverter as shown in FIG. 2) is applied to an input terminal D of the D flip-flop 222, the preliminary switch control signal Pre_SW_Ctrl_2 is applied to a clock terminal CK of the D flip-flop 222 and the comparator control signal S_1 is applied to a reset terminal Reset of the D flip-flop 222.

In the embodiments of the invention, the rising edges and falling edges of the switch control signals SW_Ctrl_1~SW_Ctrl_N are interleaved (or, not overlapped).

According to an embodiment of the invention, the comparators CMP_1~CMP_N shown in FIG. 1 may be hysteresis comparators, but the invention should not be limited thereto. The hysteresis comparator may have a corresponding hysteresis voltage region, such as the hysteresis voltage regions VHYS_1 and VHYS_2 shown in FIG. 3. The hysteresis voltage region may be defined by a upper bond voltage and a lower bond voltage, and the reference voltage VREF_n may be set to an average of the upper bond voltage and the lower bond voltage. The hysteresis voltage region may be flexibly designed based on the required sensitivity of the comparator CMP_n.

Referring to FIG. 3, according to an embodiment of the invention, since the output voltage VO_1 does not drop to a level lower than the lower bond voltage of the hysteresis voltage regions VHYS_1, the voltage control signal VCTRL is kept high during the period when the comparator control signal S_1 is asserted (for example, when a pulse is arrived or when the voltage of the comparator control signal S_1 is pulled high).

On the other hand, since the output voltage VO_2 has dropped to a level lower than the lower bond voltage of the hysteresis voltage regions VHYS_2 when the comparator control signal S_2 is asserted, the voltage control signal VCTRL may be set to a predetermined level (e.g. pulled low) to be representative of a condition that the corresponding input voltage of the comparator CMP_2 (e.g. the output voltage VO_2) is lower than the corresponding reference voltage (e.g. VREF_2) or the lower bond voltage of the hysteresis voltage region of the corresponding reference voltage. Note that when the comparators are not hysteresis comparators, the voltage control signal VCTRL may be set to the predetermined level to be representative of a condition that the corresponding input voltage of the comparator is lower than the corresponding reference voltage.

The voltage control signal VCTRL may be pulled high again when the output voltage (or, the input voltage of the corresponding comparator CMP_n) is raised to a level higher than the corresponding reference voltage VREF_n or achieves the upper bond voltage of the hysteresis voltage region of the corresponding reference voltage VREF_n as shown in FIG. 3, depending on different comparator circuit designs.

It should be noted that during the period when the comparator control signal S_n is asserted (for example, when a pulse is arrived or when the voltage of the comparator control signal S_n is pulled high), the switch SW_n is turned on in response to the corresponding comparator control signal S_n, and the comparison result of the corresponding comparator CMP_n will be output as a portion of the voltage control signal VCTRL. The control stage 120 receives the voltage control signal VCTRL and controls conduction of the charging path between the power source and the first node N1 in response to the voltage control signal VCTRL. For example, when the voltage control signal VCTRL is set to a predetermined level in response to a comparison result of a corresponding comparator CMP_n being representative of a condition that the corresponding input voltage (e.g. VO_n) is lower than the corresponding reference voltage (e.g. VREF_n) or lower than the lower bond voltage of a hysteresis voltage region of the corresponding reference voltage, the charging path between the power source and the first node N1 will be conducted for charging the external capacitor via the inductor 130 and the corresponding path in the output stage, where the corresponding path in the output stage will be conducted via the corresponding output switch OP_SW_n in response to the corresponding switch control signal SW_Ctrl_n.

On the other hand, when the voltage control signal VCTRL is not set to the predetermined level, the charging path between the power source and the first node N1 will not be conducted for not charging the external capacitor.

Figure 4:
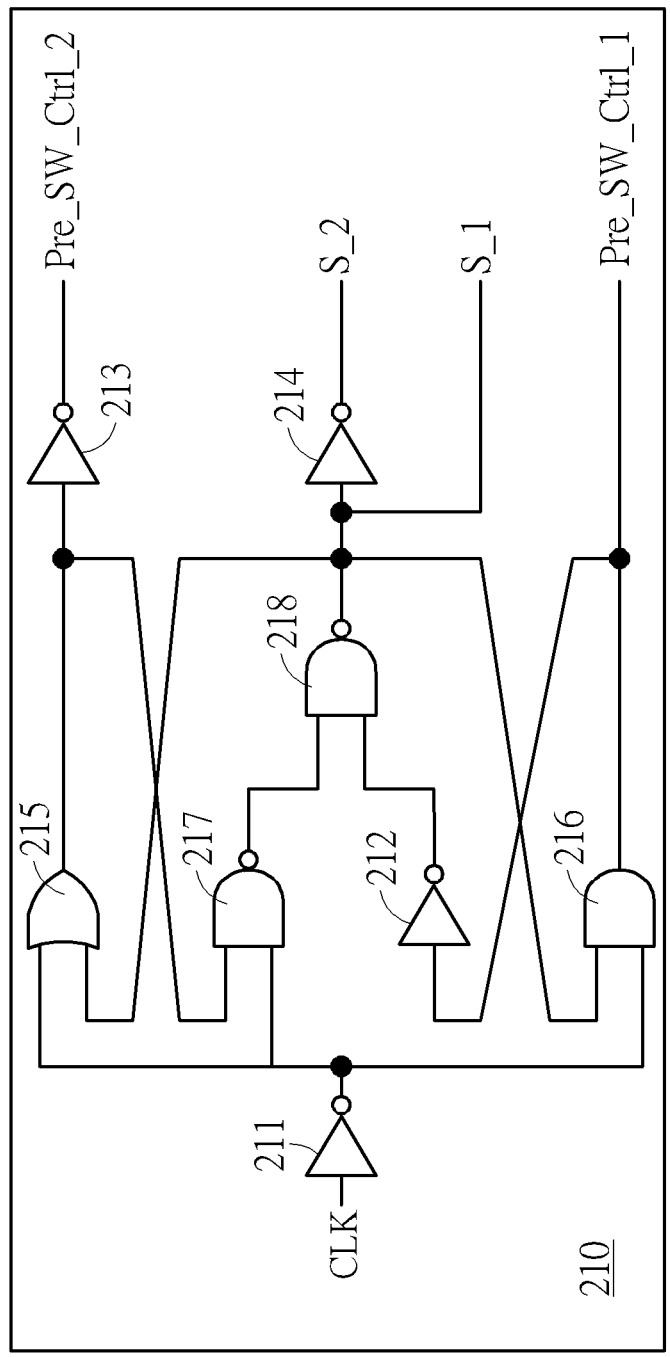
FIG. 4 is an exemplary circuit diagram of the non-overlap signal generator shown in FIG. 2 according to an embodiment of the invention.

FIG. 4 is an exemplary circuit diagram of the non-overlap signal generator 210 shown in FIG. 2 according to an embodiment of the invention. The non-overlap signal generator 210 may comprise a plurality of inverters 211-214, an OR gate 215, an AND gate 216 and a plurality of NAND gates 217 and 218, and is configured to generate the comparator control signals S_1 and S_2 and preliminary switch control signals Pre_SW_Ctrl_1 and Pre_SW_Ctrl_2 according to the clock signal CLK.

It should be noted that the logic gates and the circuits shown in FIG. 4 are merely an example of the non-overlap signal generator implemented when N=2. Those skilled in the art will readily make numerous modifications and alterations to derive the circuits of the non-overlap signal generator when N>=2 based on the exemplary circuit diagram shown in FIG. 4. According to an embodiment of the invention, one or more following conditions should be satisfied when designing the non-overlap signal generator, and the conditions comprise: (1) the falling edges of the comparator control signals S_n and the rising edges of the comparator control signals S (n+1) are aligned when n<N and the falling edges of the comparator control signals S_n and the rising edges of the comparator control signals S_1 are aligned when n=N, (2) the rising edges and the falling edges of the comparator control signal S_n and the rising edges and the falling edges of the preliminary switch control signal Pre_SW_Ctrl_n are not overlapped (interleaved) and (3) the preliminary switch control signal Pre_SW_Ctrl_n rises after (later than) the corresponding comparator control signals S_n rises, and the preliminary switch control signal Pre_SW_Ctrl_n falls before (earlier than) the corresponding comparator control signals S_n falls (or, when inverted logic levels (e.g. low active) are used, the preliminary switch control signal Pre_SW_Ctrl_n falls after (later than) the corresponding comparator control signals S_n falls, and the preliminary switch control signal Pre_SW_Ctrl_n rises before (earlier than) the corresponding comparator control signals S_n rises.

Figure 5:
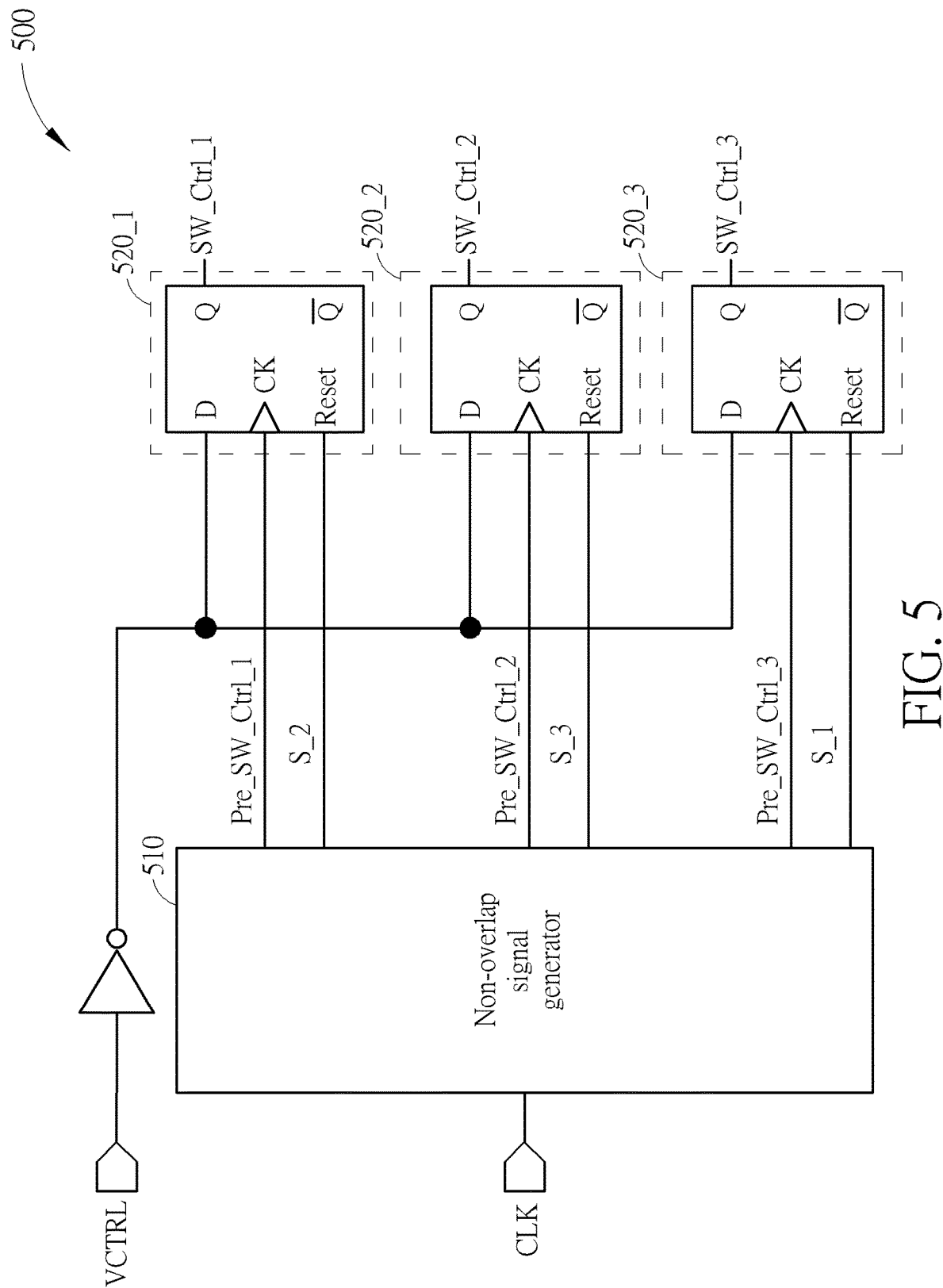
FIG. 5 is a circuit diagram of a control signal generating circuit according to another embodiment of the invention.
Figure 6:
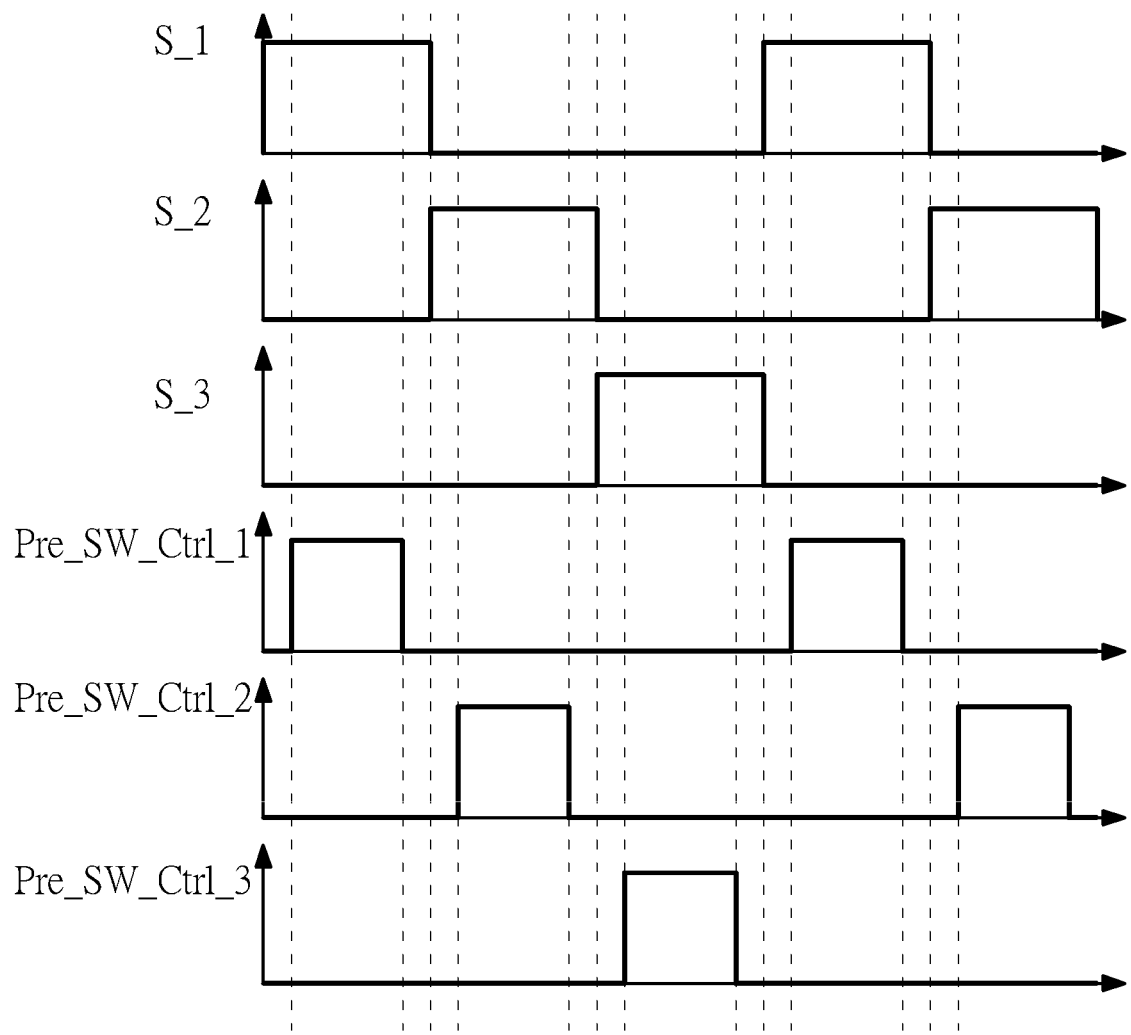
FIG. 6 is a diagram showing the waveforms of the comparator control signals and the preliminary switch control signals for the case when N=3 according to an embodiment of the invention.

FIG. 5 is a circuit diagram of a control signal generating circuit according to another embodiment of the invention. The control signal generating circuit 500 is an exemplary circuit implemented when N=3. The control signal generating circuit 500 is configured to generate the switch control signals SW_Ctrl_1, SW_Ctrl_2 and SW_Ctrl_3 and may comprise a non-overlap signal generator 510 and a plurality of flip-flop circuits 520_1, 520_2 and 520_3. The non-overlap signal generator 510 is configured to generate comparator control signals S_1, S_2 and S_3 and preliminary switch control signals Pre_SW_Ctrl_1, Pre_SW_Ctrl_2 and Pre_SW_Ctrl_3 according to a clock signal CLK. FIG. 6 is a diagram showing the waveforms of the comparator control signals and the preliminary switch control signals for the case when N=3 according to an embodiment of the invention.

Figure 7:
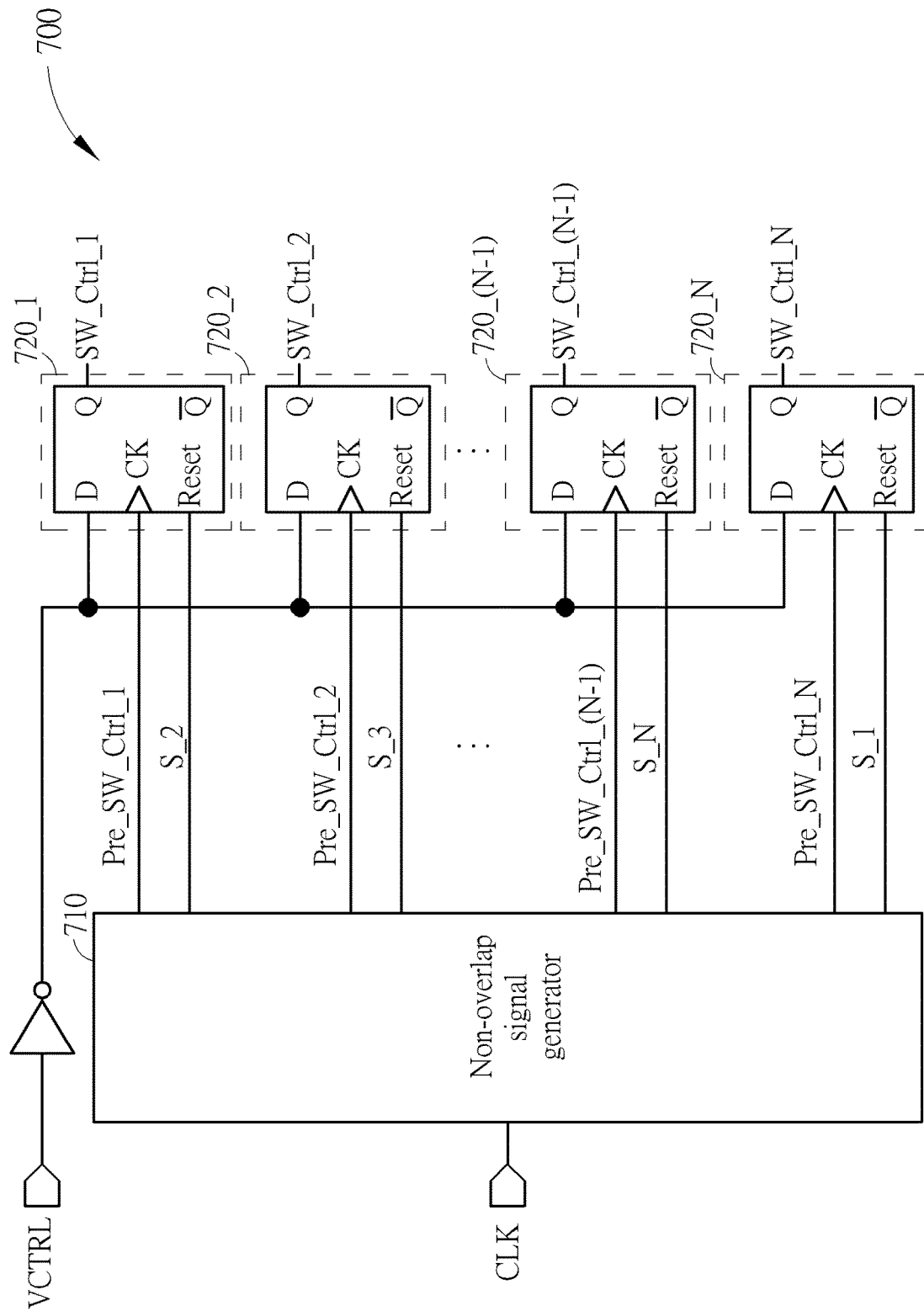
FIG. 7 is a circuit diagram of a control signal generating circuit according to yet another embodiment of the invention.
Figure 8:
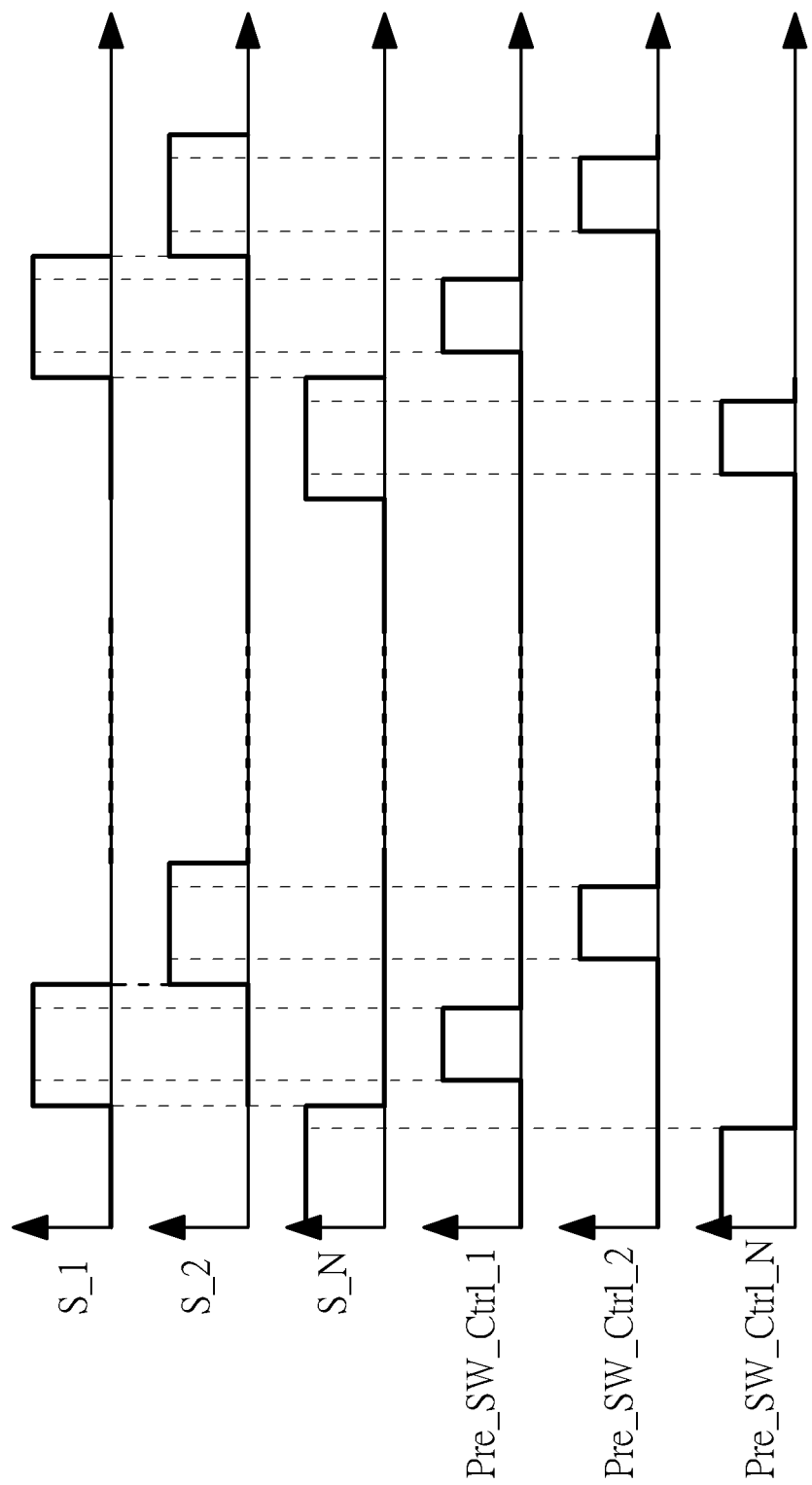
FIG. 8 is a diagram showing the waveforms of the comparator control signals and the preliminary switch control signals for the case when N>3 according to an embodiment of the invention.

FIG. 7 is a circuit diagram of a control signal generating circuit according to yet another embodiment of the invention. The control signal generating circuit 700 is an exemplary circuit implemented when N>3. The control signal generating circuit 700 is configured to generate the switch control signals SW_Ctrl_1~SW_Ctrl_N and may comprise a non-overlap signal generator 710 and a plurality of flip-flop circuits 720_1~720_N. The non-overlap signal generator 710 is configured to generate comparator control signals S_1~S_N and preliminary switch control signals Pre_SW_Ctrl_1~Pre_SW_Ctrl_N according to a clock signal CLK. FIG. 8 is a diagram showing the waveforms of the comparator control signals and the preliminary switch control signals for the case when N>3 according to an embodiment of the invention.

According to the embodiments of the invention, for the cases where N>=2, according to an embodiment of the invention, as shown in FIG. 5 and FIG. 7, the voltage control signal VCTRL is applied to the input terminal D of all the D flip-flops, the n-th preliminary switch control signal Pre_SW_Ctrl_n is applied to the clock terminal CK of the D flip-flop of n-th flip-flop circuit, (n+1)-th comparator control signal S (n+1) is applied to the reset terminal Reset of the D flip-flop of the n-th flip-flop circuit when n is smaller than the predetermined number N and the first comparator control signal S_1 is applied to the reset terminal Reset of the D flip-flop of the n-th flip-flop circuit when n is equal to the predetermined number N.

According to an embodiment of the invention, for the case where N>=2, as shown in FIG. 6 and FIG. 8, the falling edges of the comparator control signal S_n and the rising edges of the comparator control signal S (n+1) may be aligned when n is smaller than the predetermined number N, and the falling edges of the comparator control signal S_n and the rising edges of the comparator control signal S_1 may be aligned when n is equal to the predetermined number N.

In addition, the rising edges and the falling edges of the comparator control signal S_n and the rising edges and the falling edges of the preliminary switch control signal Pre_SW_Ctrl_n are interleaved. In other words, the rising edges and the falling edges of the comparator control signal S_n and the rising edges and the falling edges of the preliminary switch control signal Pre_SW_Ctrl_n generated by the proposed non-overlap signal generator (e.g. 210, 510, 710) are not overlapped.

Therefore, according to an embodiment of the invention, the rising edges and the falling edges of the comparator control signals S_1~S_N and the rising edges and the falling edges of the preliminary switch control signals Pre_SW_Ctrl_1~Pre_SW_Ctrl_N are interleaved (or, not overlapped).

Via the proposed control signal generating circuits, the timings of the switch control signals are well-controlled based on the voltage control signal VCTRL. In this manner, the DC-DC converter with timing skipping control can be achieved. The timing skipping control is an effective approach to solve the conventional cross regulation problem. Based on the proposed timing skipping control, the charging path between the power source and the external capacitor will be conducted only when a charging operation is required. In addition, the output switch will be turned on only when a charging operation is required as well. Therefore, power consumption of the DC-DC converter can also be reduced as compared to the conventional design in which the output switches are sequentially turned on in a timing-multiplexing manner regardless of whether charging operation is really required.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage generating circuit, comprising:
an input stage, comprising:
a plurality of comparators, each being configured to receive an input voltage and a reference voltage and generate a comparison result according to the input voltage and the reference voltage; and
a multiplexer, coupled to the comparators and configured to output a voltage control signal sequentially carrying the comparison results of the comparators;
a control stage, configured to control conduction of a charging path between a power source and a first node in response to the voltage control signal;
an inductor, coupled between the first node and a second node; and
an output stage, comprising:
a plurality of output switches, each being coupled to the second node and selectively turned on or off in response to a corresponding switch control signal,
wherein the switch control signals are generated according to the voltage control signal, and rising edges and falling edges of the switch control signals are interleaved, and
the voltage generating circuit further comprises:
a control signal generating circuit, configured to generate the switch control signals and comprising:
a non-overlap signal generator, configured to generate a plurality of comparator control signals and a plurality of preliminary switch control signals according to a clock signal, wherein a portion of rising edges and a portion of falling edges of the comparator control signals are overlapped, and the rising edges and the falling edges of the comparator control signals and rising edges and falling edges of the preliminary switch control signals are interleaved; and
a plurality of flip-flop circuits, each being configured to receive the voltage control signal, one of the comparator control signals and one of the preliminary switch control signals and generate one of the switch control signals according to the voltage control signal, said one of the comparator control signals and said one of the preliminary switch control signals.

2. The voltage generating circuit of claim 1, wherein each output switch is further coupled to an external capacitor, and the output switch is turned on to connect the external capacitor to the second node only when the voltage control signal is set to a predetermined level in response to the comparison result of a corresponding comparator being representative of a condition that the corresponding input voltage is lower than the corresponding reference voltage.

3. The voltage generating circuit of claim 2, wherein an output voltage generated at one terminal of the external capacitor is further applied to the corresponding comparator as the corresponding input voltage.

4. The voltage generating circuit of claim 1, wherein each flip-flop circuit comprises a D flip-flop, the voltage control signal is applied to an input terminal of the D flip-flop, said one of the preliminary switch control signals is applied to a clock terminal of the D flip-flop and said one of the comparator control signals is applied to a reset terminal of the D flip-flop.

5. The voltage generating circuit of claim 1, wherein the comparator control signals are further applied to the multiplexer for controlling output of the comparison results.

6. A voltage generating circuit, comprising:
an input stage, comprising:
a first comparator, configured to receive a first input voltage and a first reference voltage and generate a first comparison result according to the first input voltage and the first reference voltage;
a second comparator, configured to receive a second input voltage and a second reference voltage and generate a second comparison result according to the second input voltage and the second reference voltage; and
a multiplexer, coupled to the first comparator and the second comparator and configured to output a voltage control signal sequentially carrying the first comparison result and the second comparison result;
a control stage, configured to control conduction of a charging path between a power source and a first node in response to the voltage control signal;
an inductor, coupled between the first node and a second node; and
an output stage, comprising:
a first output switch, coupled to the second node and being selectively turned on or off in response to a first switch control signal; and
a second output switch, coupled to the second node and being selectively turned on or off in response to a second switch control signal,
wherein the first switch control signal and the second switch control signal are generated according to the voltage control signal, and rising edges and falling edges of the first switch control signals and rising edges and falling edges of the second switch control signals are interleaved, and
the voltage generating circuit further comprises:
a control signal generating circuit, configured to generate the first switch control signal and the second switch control signal, comprising:
a non-overlap signal generator, configured to generate a first comparator control signal, a second comparator control signal, a first preliminary switch control signal and a second preliminary switch control signal according to a clock signal, wherein rising edges and falling edges of the first comparator control signal and rising edges and falling edges of the first preliminary switch control signal are interleaved, rising edges and falling edges of the second comparator control signal and rising edges and falling edges of the second preliminary switch control signal are interleaved, and the falling edges of the first comparator control signal and the rising edges of the second comparator control signal are aligned;
a first flip-flop circuit, configured to receive the voltage control signal, the second comparator control signal and the first preliminary switch control signal and generate the first switch control signal according to the voltage control signal, the second comparator control signal and the first preliminary switch control signal; and
a second flip-flop circuit, configured to receive the voltage control signal, the first comparator control signal and the second preliminary switch control signal and generate the second switch control signal according to the voltage control signal, the first comparator control signal and the second preliminary switch control signal.

7. The voltage generating circuit of claim 6, wherein the first output switch is further coupled to a first external capacitor, and the first output switch is turned on to connect the first external capacitor to the second node only when the voltage control signal is set to a predetermined level in response to the first comparison result being representative of a condition that the first input voltage is lower than the first reference voltage.

8. The voltage generating circuit of claim 7, wherein an output voltage generated at one terminal of the first external capacitor is further applied to the first comparator as the first input voltage.

9. The voltage generating circuit of claim 6, wherein the second output switch is further coupled to a second external capacitor, and the second output switch is turned on to connect the second external capacitor to the second node only when the voltage control signal is set to a predetermined level in response to the second comparison result being representative of a condition that the second input voltage is lower than the second reference voltage.

10. The voltage generating circuit of claim 9, wherein an output voltage generated at one terminal of the second external capacitor is further applied to the second comparator as the second input voltage.

11. The voltage generating circuit of claim 6, wherein the first flip-flop circuit comprises a D flip-flop, the voltage control signal is applied to an input terminal of the D flip-flop, the first preliminary switch control signal is applied to a clock terminal of the D flip-flop and the second comparator control signal is applied to a reset terminal of the D flip-flop.

12. The voltage generating circuit of claim 6, wherein the second flip-flop circuit comprises a D flip-flop, the voltage control signal is applied to an input terminal of the D flip-flop, the second preliminary switch control signal is applied to a clock terminal of the D flip-flop and the first comparator control signal is applied to a reset terminal of the D flip-flop.

13. The voltage generating circuit of claim 6, wherein the first comparator control signal and the second comparator control signal are further applied to the multiplexer for respectively controlling output of the first comparison result and the second comparison result.

14. A voltage generating circuit, comprising:
an input stage, comprising:
a predetermined number of comparators, each being configured to receive an input voltage and a reference voltage and generate a comparison result according to the input voltage and the reference voltage; and
a multiplexer, coupled to the comparators and configured to receive a predetermined number of comparator control signals and output a voltage control signal sequentially carrying the comparison results of the comparators, wherein the multiplexer controls output of the comparison results in response to the comparator control signals;
a control stage, configured to control conduction of a charging path between a power source and a first node in response to the voltage control signal;
an inductor, coupled between the first node and a second node; and
an output stage, comprising:
a predetermined number of output switches, each being coupled to the second node and selectively turned on or off in response to a corresponding switch control signal, wherein the switch control signals are generated according to the voltage control signal, and rising edges and falling edges of the switch control signal applied to n-th output switch and rising edges and falling edges of n-th comparator control signal are not overlapped, and wherein n is a positive integer smaller than or equal to the predetermined number, and
the voltage generating circuit further comprises:
a control signal generating circuit, configured to generate the switch control signals and comprising:
a non-overlap signal generator, configured to generate the comparator control signals and a predetermined number of preliminary switch control signals according to a clock signal, wherein the rising edges and the falling edges of the n-th comparator control signal and rising edges and falling edges of n-th preliminary switch control signals are not overlapped; and
a predetermined number of flip-flop circuits, each being configured to receive the voltage control signal, one of the comparator control signals and one of the preliminary switch control signals and generate one of the switch control signals according to the voltage control signal, said one of the comparator control signals and said one of the preliminary switch control signals.

15. The voltage generating circuit of claim 14, wherein the n-th output switch is turned on to connect an external capacitor to the second node only when the voltage control signal is set to a predetermined level in response to the comparison result of n-th comparator being representative of a condition that the corresponding input voltage is lower than the corresponding reference voltage.

16. The voltage generating circuit of claim 15, wherein an output voltage generated at one terminal of the external capacitor is further applied to the n-th comparator as the corresponding input voltage.

17. The voltage generating circuit of claim 14, wherein each flip-flop circuit comprises a D flip-flop, the voltage control signal is applied to an input terminal of the D flip-flops, the n-th preliminary switch control signal is applied to a clock terminal of the D flip-flop of n-th flip-flop circuit, (n+1)-th comparator control signal is applied to a reset terminal of the D flip-flop of the n-th flip-flop circuit when n is smaller than the predetermined number and the first comparator control signal is applied to a reset terminal of the D flip-flop of the n-th flip-flop circuit when n is equal to the predetermined number.

* * * * *